Dec. 8, 1970   J. R. KITTRELL   3,546,096
HYDROCARBON CONVERSION CATALYST AND PROCESS
Filed Nov. 14, 1968
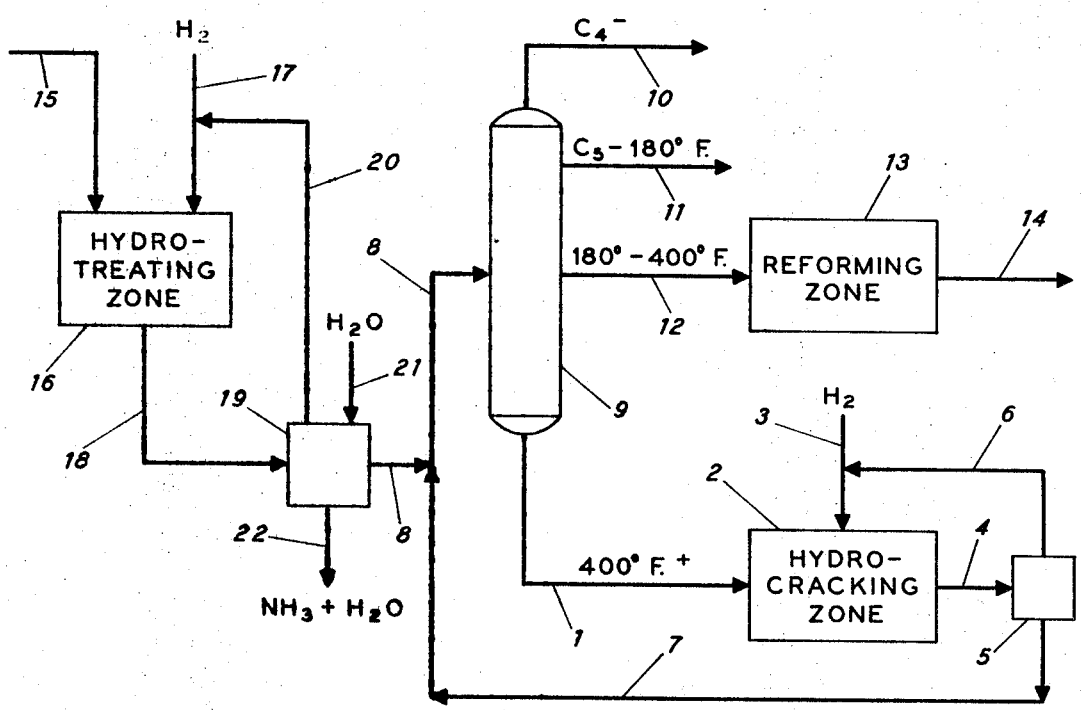
INVENTOR
JAMES R. KITTRELL
BY
ATTORNEYS

United States Patent Office 3,546,096
Patented Dec. 8, 1970

3,546,096
HYDROCARBON CONVERSION CATALYST AND PROCESS
James R. Kittrell, El Cerrito, Calif., assignor to Chevron Research Company, San Francisco, Calif., a corporation of Delaware
Continuation-in-part of application Ser. No. 759,601, Sept. 13, 1968. This application Nov. 14, 1968, Ser. No. 775,627
The portion of the term of the patent subsequent to Aug. 27, 1985, has been disclaimed
Int. Cl. C10g 23/00
U.S. Cl. 208—60       8 Claims

ABSTRACT OF THE DISCLOSURE

A hydrocarbon conversion catalyst consisting essentially of an ultra-stable crystalline zeolitic molecular sieve component, a component selected from nickel and compounds thereof, and a component selected from tin and compounds thereof, and processes using said catalyst.

RELATED APPLICATION

This application is a continuation-in-part of James R. Kittrell application Ser. No. 759,601, filed Sept. 13, 1968 now abandoned.

INTRODUCTION

This invention relates to catalytic hydrocracking of petroleum distillates and solvent-deasphalted residua to produce high-value fuel products, including gasoline.

PRIOR ART

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, and hydrodesulfurization.

It is known from the paper "A New Ultra Stable Form of Faujasite," by C. V. McDaniel and P. K. Maher, of Washington Research Centre, Davison Division, W. R. Grace & Co., Clarksville, Md., presented at Molecular Sieve Conference, Society of Chemical Industry, London, England, April, 1967, and from the published preprint of said paper, that ultra-stable faujasites with a sodium content below about 3 weight percent, calculated as $Na_2O$, may be prepared that have a substantially higher temperature of faujasite structure collapse than previously known forms of faujasite having a correspondingly low sodium content. The paper indicates that as sodium is removed from the sodium form of faujasite, a critical point is reached at around 3 weight percent $Na_2O$, after which previously known forms of faujasite suffer structural collapse at temperature levels that decrease rapidly as additional sodium is removed. For example, the previously known type "Y" faujasites were structurally stable at a temperature of about 850° C. at a sodium content level of about 3.2 weight percent, calculated as $Na_2O$, but further sodium removal resulted in a marked decrease in structural thermal stability, to the extent that when the sodium level was reduced to about zero, the structural collapse temperature had dropped to about 600° C. The paper further indicates that the ultra-stable zeolites prepared by the procedures given in the paper have increasing structural thermal stability as the sodium level is reduced below about 3 weight percent $Na_2O$, to the extent that when the sodium level is reduced to about zero, the structural collapse temperature exceeds 1000° C. The paper further indicates that the unit cell size of the ultra-stable faujasites, containing less than about 3 weight percent sodium, calculated as $Na_2O$, is less than that of the corresponding previously known unstabilized faujasites, due to cell shrinkage as sodium is removed and the faujasites are subjected to the other preparation procedures given in the paper. The differences in unit cell size in angstroms between the low-sodium-content ultra-stable faujasites and the previously known unstabilized faujasites, for various faujasite silica-alumina ratios, is given in the paper by the following curves:

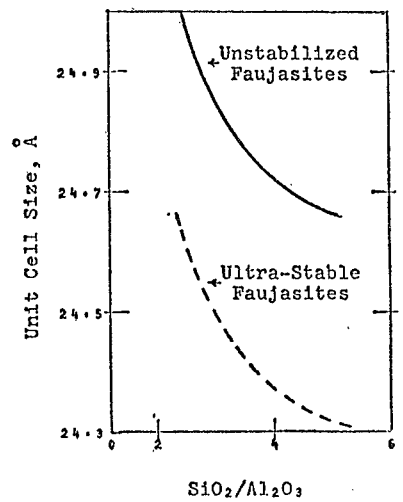

From the foregoing, it will be seen that faujasites defined as having a silica/alumina ratio above about 2.15, a unit cell size below about 24.65, and a sodium content below about 3 weight percent, calculated as $Na_2O$, are ultra-stable faujasites, and that the previously known unstabilized faujasites fall outside this definition. Accordingly, as used herein, the term "ultra-stable" as applied to various crystalline zeolitic molecular sieves means that the molecular sieves referred to have:

(a) a silica/alumina ratio above about 2.15, and
(b) a unit cell size below about 24.65 angstroms, and
(c) a sodium content below about 3 weight percent, calculated as $Na_2O$.

OBJECTS

It is an object of the present invention to provide an improved catalyst comprising a crystalline zeolitic molecular sieve component, to provide a hydrocracking process using said improved catalyst that is capable of producing excellent-quality gasoline and other valuable fuel products, and to provide methods of operating the hydrocracking process in an integrated manner with other process units to achieve various advantageous results.

The present invention will best be understood, and further objects and advantages thereof will be apparent, from the following description when read in connection with the accompanying drawing.

DRAWING

The drawing is a diagrammatic illustration of apparatus and flow paths suitable for carrying out the process of several of the embodiments of the present invention, including embodiments wherein a selected fraction from the hydrocracking zone is catalytically reformed.

STATEMENT OF INVENTION

In accordance with the present invention there is provided a hydrocarbon conversion catalyst consisting essentially of an ultra-stable crystalline zeolitic molecular sieve cracking component, that is, a crystalline zeolitic molecular sieve having a sodium content below 3 weight percent, calculated as Na$_2$O, a unit cell size below about 24.65 angstroms, and a silica/alumina ratio above about 2.15, a component selected from nickel and compounds thereof, and a component selected from tin and compounds thereof.

In accordance with the present invention there also is provided a hydrocracking process which comprises contacting a hydrocarbon feedstock at hydrocracking conditions with hydrogen and a catalyst consisting essentially of an ultra-stable crystalline zeolitic molecular sieve cracking component, a component selected from nickel and compounds thereof, and a component selected from tin and compounds thereof.

Further in accordance with a preferred embodiment of the present invention there is provided a hydrocarbon conversion process which comprises hydrofining in a first reaction zone a hydrocarbon feedstock selected from the group consisting of petroleum distillates, solvent-deasphalted petroleum residua, shale oils and coal tar distillates, said feedstock containing substantial amounts of materials boiling above 200° F. and containing 200 to 10,000 p.p.m. organic nitrogen, said hydrofining being accomplished in said first reaction zone in the presence of at least 500 s.c.f. of hydrogen per barrel of said feedstock and in the presence of a hydrofining catalyst, at a temperature in the range 400° to 900° F., a pressure in the range 800 to 3500 p.s.i.g. and a liquid hourly space velocity in the range 0.1 to 5.0, said hydrofining being accomplished to the extent that the organic nitrogen content of said feedstock is reduced to between 0.1 and 10 p.p.m., and hydrocracking at least a substantial portion of the resulting hydrofined feedstock in a second reaction zone at a temperature in the range 400° to 950° F., a pressure in the range 800 to 3500 p.s.i.g., and a liquid hourly space velocity in the range 0.1 to 5.0, in the presence of 200 to 20,000 s.c.f. of hydrogen per barrel of hydrocarbon feedstock supplied to said second reaction zone, and in the presence of a catalyst composite consisting essentially of an ultra-stable crystalline zeolitic molecular sieve component, a component selected from nickel and compounds thereof, and a component selected from tin and compouds thereof.

The hydrocracking zone of the process of the present invention may be operated once through, or advantageously may be operated by recycling thereto materials from the effluent thereof that boil above 400° F., or, if desired, above 550° F. At least a portion of the materials boiling below 400° F that are separated from the effluent from the hydrocracking zone advantageously may be catalytically reformed.

HYDROCARBON FEEDSTOCKS

The feedstocks supplied to the hydrocracking zone containing a catalyst comprising an ultra-stable crystalline zeolitic molecular sieve component in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocracking zone containing the catalyst comprising an ultra-stable crystalline zeolitic molecular sieve.

NITROGEN CONTENT OF FEEDSTOCK

The feedstocks used in the process of the present invention will contain 200 to 10,000 p.p.m. organic nitrogen. In a preferred embodiment of the invention, these feedstocks are hydrofined in a first reaction zone before being hydrocracked in a second reaction zone containing the catalyst of the present invention. The hydrofining accomplished in the first reaction zone will reduce the nitrogen content of the feedstocks to between 0.1 and 10 p.p.m. organic nitrogen. The hydrofining step advantageously also may accomplish hydrogenation and a reasonable amount of hydrocracking.

SULFUR CONTENT OF FEEDSTOCKS

While the process of the present invention can be practiced with utility when supplying to the hydrocracking zone containing a catalyst comprising a molecular sieve component, hydrocarbon feeds containing relatively large quantities of organic sulfur, it is preferable to maintain the organic sulfur content of the feed to that zone in a range of 0 to 3 weight percent, preferably 0 to 1 weight percent.

FIRST STAGE HYDROFINING CATALYST IN TWO-STAGE EMBODIMENT OF PROCESS OF PRESENT INVENTION

(A) General

The first stage hydrofining catalyst comprises a hydrogenating component selected from Group VI metals and compounds thereof, a hydrogenating component selected from Group VIII metals and compounds thereof, and a support selected from the group consisting of alumina and silica-alumina.

The hydrofining catalyst preferably has both hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia, and hydrogen sulfide.

Preferably, said hydrofining catalyst contains nickel or cobalt or compounds thereof in an amount of 1 to 15 weight percent, calculated as metal, and molybdenum or tungsten or compounds thereof in an amount of 5 to 30 weight percent, calculated as metal, with the remainder of the catalyst consisting of alumina, or silica-alumina containing up to 50 weight percent silica.

Particularly preferred examples of said hydrofining catalyst, comprising silica-alumina, are:

| | Percent by weight of total catalyst, calculated as metal | | | SiO$_2$/Al$_2$O$_3$, weight ratio |
|---|---|---|---|---|
| | Ni | Mo | W | |
| 1 | 4–10 | 15–25 | | 10–90–30/70 |
| 2 | 6–15 | | 15–30 | 30–70–50/50 |

It has been found that use of said hydrofining catalyst, particularly when it has substantial hydrogenation activity, increases the gasoline yield from the hydrocracking stage containing a catalyst comprising an ultra-stable crystalline zeolitic molecular sieve component, compared with the gasoline yield from the hydrocracking stage when the identical feed thereto has not previously been processed in the presence of said hydrofining catalyst. The increased gasoline yield probably is related to the hydrogenation, in that more saturated hydrocarbon structures tend to crack more easily.

The hydrocracking catalyst comprising an ultra-stable crystalline zeolitic molecular sieve component has activity and stability advantages over a conventional hydrocracking catalyst. It has been found that use of said hydrofining catalyst in the above-described arrangements further increases the activity and stability of the hydrocracking catalyst containing an ultra-stable molecular sieve component, compared with the activity and stability of the latter catalyst when the identical feed thereto has not previously been processed in the presence of said hydrofining catalyst to reduce the nitrogen content of the feedstock to between 0.1 and 10 parts per million.

(B) Method of preparation

Said hydrofining catalyst may be prepared by any conventional preparation method, including impregnation of an alumina or silica-alumina support with salts of the desired hydrogenating component, or cogelation of all components, with the latter method being preferred.

CATALYST COMPRISING AN ULTRA-STABLE CRYSTALLINE ZEOLITIC MOLECULAR SIEVE COMPONENT AND PREPARATION THEREOF

(A) General

The ultra-stable crystalline zeolitic molecular sieve-containing catalyst of the present invention is an effective hydrocracking catalyst. It is not contained in a matrix of other catalyst components. It is surprising to find that by using a critical combination of an ultra-stable crystalline zeolitic molecular sieve component and a nickel hydrogenation component augmented with a tin component, excellent results can be achieved without dispersing the molecular sieve component in a matrix of other catalyst components. The ultra-stable crystalline zeolitic molecular sieve component of the catalyst may be an ultra-stable form of any type of crystalline zeolitic molecular sieve that is known in the art as a useful component of a conventional hydrocracking catalyst. An ultra-stable form of faujasite, that is, one having a sodium content below 3 weight percent, calculated as $Na_2O$, a unit cell size below about 24.65 angstroms, and a silica/alumina ratio above about 2.15, in the ammonia or hydrogen form, is especially preferred.

It has been found that the presence of tin, in the metal, oxide or sulfide form, in the catalyst of the present invention, results in higher hydrocracking activity and higher hydrogenation activity than would be exhibited by a catalyst that is identical except that contains no tin. Further, the presence of tin permits the hydrogenation activity to be controlled in an essentially reversible manner by varying the amount of sulfur present in the hydrocarbon feed.

(B) Method of preparation

The molecular sieve component of the catalyst, prior to being converted to an ultra-stable form, may be prepared by any conventional methods known in the art. The molecular sieve component so prepared may be converted to the ultra-stable form by the methods set forth in said McDaniel and Maher paper.

The nickel and tin components of the catalyst may be combined with the molecular sieve component in any convenient manner, as by ion exchange and/or impregnation, using suitable compounds of nickel and tin, for example chlorides. The nickel content of the catalyst will be 0.5 to 15 weight percent, calculated as metal. The tin content of the catalyst will be 0.1 to 10 weight percent, calculated as metal.

Following ion exchange and/or impregnation, the catalyst is dried in a conventional manner, and then desirably is activated in an oxygen-containing gas stream for 1 to 10 hours at 900° to 1600° F., preferably 2 to 8 hours at 1000° to 1500° F.

The finished catalyst may be sulfided in a conventional manner prior to use, if desired. If not presulfided, the catalyst will tend to become sulfided during process operation from any sulfur content that may be present in the hydrocarbon feed.

OPERATING CONDITIONS

The hydrocracking zone containing the catalyst comprising an ultra-stable molecular sieve component is operated at hydrocracking conditions including a temperature in the range 400° to 950° F., preferably 500° to 850° F., a pressure in the range 800 to 3500 p.s.i.g., preferably 1000 to 3000 p.s.i.g, a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of said feedstock.

The operating conditions for the hydrofining zone, when a hydrofining step precedes the hydrocracking step, include a temperature of 400° to 900° F., preferably 500° to 800° F., a pressure of 800 to 3500 p.s.i.g., preferably 1000 to 2500 p.s.i.g, and a liquid hourly space velocity of 0.1 to 5.0, preferably 0.5 to 3.0. In addition to hydrofining, there also may be accomplished concurrently in the hydrofining zone hydrogenation and some hydrocracking. The total hydrogen supply rate (makeup and recycle hydrogen) is 200 to 20,000 s.c.f., preferably 2000 to 20,000 s.c.f., of hydrogen per barrel of said feedstock.

The operating conditions in the reforming zone and catalytic cracking zone employed in various embodiments of the present invention are conventional conditions known in the art.

PROCESS OPERATION WITH REFERENCE TO DRAWING

Referring now to the drawing, in accordance with one embodiment of the present invention, a hydrocarbon feedstock as previously described, which in this case may boil above 400° F. and which contains between 0.1 and 10 p.p.m. organic nitrogen, is passed through line 1 into hydrocracking zone 2, which contains a hydrocracking catalyst consisting essentially of an ultra-stable crystalline zeolitic molecular sieve component, a nickel component and a tin component. The feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a $C_4^-$ fraction which is withdrawn through line 10, a $C_5$–180° F. fraction which is withdrawn through line 11, and a 180°–400° F. fraction which is withdrawn through line 12.

In accordance with another embodiment of the present invention, the 180°–400° F. fraction in line 12 is reformed under conventional catalytic reforming conditions in reforming zone 13, from which a catalytic reformate is withdrawn through line 14.

In accordance with a further embodiment of the present invention, a hydrocarbon feedstock containing 200 to 10,000 p.p.m. organic nitrogen which is to be hydofined and also hydrogenated and/or partially hydrocracked, if desired, in a separate hydrotreating zone prior to being hydrocracked in hydrocracking zone 2, is passed through line 15 to hydrotreating zone 16 containing a catalyst, as previously described, having hydrofining activity and desirably also having substantial hydrogenation activity. The feedstock is hydrotreated in zone 16 at conditions previously described, in the presence of hydrogen supplied through line 17, and thereby the organic nitrogen content thereof is reduced to between 0.1 and 10 parts per million. The effluent from hydrotreating zone 16 is passed through line 18 to separation zone 19, from which hydrogen separated from the treated feedstock is recycled through line 20 to hydotreating zone 16. In zone 19, water entering through line 21 is used to scrub ammonia and other contaminants from the incoming hydrocarbon stream, and the ammonia, water and other contaminants are withdrawn from zone 19 through line 22.

EXAMPLES

The following examples are given for the purpose of further illustrating the practice of the process of the present invention. However, it is to be understood that these examples are given by way of exemplification only, and are not intended in any way to limit the scope of the present invention.

EXAMPLE 1

A catalyst consisting essentially of an ultra-stable crystalline zeolitic molecular sieve, a nickel component and a tin component (Catalyst A) is prepared. The catalyst has the following composition:

| Component | Wt. percent of total Catalyst |
|---|---|
| NiO | 8.0 |
| SnO$_2$ | 4.0 |
| Ultra-stable crystalline zeolitic molecular sieve, "Y" form | 88.0 |
| Total | 100.0 |

The catalyst is prepared by the following steps, using sufficient quantities of the various starting materials to produce the above-indicating weight percentages of the components of the final catalyst:

(1) An ultra-stable ammonium "Y" crystalline zeolitic molecular sieve in finely divided form is contacted with solutions of NiCl$_2$ and SnI$_4$.

(2) The nickel- and tin-containing molecular sieve is filtered, washed repeatedly to remove chloride and any other ionic impurities, and tabletted.

(3) The resulting catalyst tablets are dried in an air-circulating oven and then are activated in flowing air for approximately 5 hours at 950° F.

EXAMPLE 2

A conventional commercial cogelled catalyst comprising silica-alumina and 10 weight percent nickel (Catalyst B, a comparison catalyst) is prepared.

EXAMPLE 3

Catalysts A and B are separately used to hydrocrack separate portions of a heavy gas oil feedstock which has been hydrofined in the presence of a conventional hydrofining catalyst to reduce the organic nitrogen content from above 200 parts per million to 9 parts per million.

The gas oil feedstock has the following characteristics:

| | |
|---|---|
| Gravity, ° API | 27.5 |
| Aniline point, ° F. | 182 |
| Sulfur content, p.p.m. | 8 |
| Nitrogen content, p.p.m. | 9 |
| ASTM Distillation, D–1160 | |
| ST/5: 403/499 | |
| 10/30: 531/604 | |
| 50: 672 | |
| 70/90: 752/868 | |
| 95/EP: 912/967 | |

The hydrocracking conditions are:
Total pressure, p.s.i.g.—1900.
Total hydrogen rate, s.c.f./bbl.—5600.
Liquid hourly space velocity, v./v./hr.—1.5.
Per-pass conversion to products boiling below 500° F., vol. percent—60.
Starting temperature, ° F.—As indicated below.

The hydrocracking is accomplished on a recycle basis, that is, with recycle to the hydrocracking zone from the effluent thereof materials boiling above 500° F.

The hydrocracking activities of the two catalysts, as measured by the operating temperatures necessary to achieve the indicated per-pass conversion, and the fouling rates of the two catalysts, as indicated by the hourly rise in temperature necessary to maintain the indicated per-pass conversion, are:

| | Catalyst A | Catalyst B |
|---|---|---|
| Operating temperature, ° F. | 635 | 665 |
| Fouling rate, ° F./hr. | 0.05 | 0.04 |

From the foregoing, it may be seen that Catalyst A is substantially more active than Catalyst B, and has a similar low fouling rate. The activity of Catalyst A is considerably higher, and the fouling rate is considerably lower, in this operation with a feedstock containing 0.1 to 10 p.p.m. nitrogen, than in an operation where the feedstock contains substantially higher amounts of nitrogen.

EXAMPLE 4

The 180°–400° F. portion of the product of Example 3, obtained with Catalyst A, is catalytically reformed, using a conventional reforming catalyst and conventional reforming conditions, and is found to be a superior feedstock for this operation.

Although only specific embodiments of the present invention have been described, numerous variations can be made in these embodiments without departing from the spirit of the invention, and all such variations that fall within the scope of the appended claims are intended to be embraced thereby.

What is claimed is:

1. A hydrocarbon conversion catalyst consisting essentially of an ultra-stable crystalline zeolitic molecular sieve cracking component which is a faujasite having a sodium content below 3 weight percent, calculated as Na$_2$O, a unit cell size below about 24.65 angstroms, and a silica/alumina ratio above about 2.15, a component selected from nickel and compounds thereof in an amount of from 0.5 to 15 weight percent, calculated as metal, and a component selected from tin and compounds thereof in an amount of from 0.1 to 10 weight percent, calculated as metal.

2. A hydrocracking process which comprises contacting a hydrocarbon feedstock at hydrocracking conditions with hydrogen and a catalyst consisting essentially of an ultra-stable crystalline zeolitic molecular sieve cracking component which is a faujasite having a sodium content below 3 weight percent, calculated as Na$_2$O, a unit cell size below about 24.65 angstroms, and a silica/alumina ratio above about 2.15, a component selected from nickel and compounds thereof in an amount of from 0.5 to 15 weight percent, calculated as metal, and a component selected from tin and compounds thereof in an amount of from 0.1 to 10 weight percent, calculated as metal.

3. A hydrocarbon conversion process which comprises hydrofining in a first reaction zone a hydrocarbon feedstock selected from the group consisting of petroleum distillates, solvent-deasphalted petroleum residua, shale oils and coal tar distillates, said feedstock containing substantial amounts of materials boiling above 200° F. and containing 200 to 10,000 parts per million organic nitrogen, said hydrofining being accomplished in said first reaction zone in the presence of at least 500 s.c.f. of hydrogen per barrel of said feedstock and in the presence of a hydrofining catalyst, at a temperature in the range 400° to 900° F., a pressure in the range 800 to 3500 p.s.i.g., and a liquid hourly space velocity in the range 0.1 to 5.0, said hydrofining being accomplished to the extent that the organic nitrogen content of said feedstock is reduced to between 0.1 and 10 parts per million, and hydrocracking at least a substantial portion of the resulting hydrofined feedstock in a second reaction zone at a temperature in the range 400° to 950° F., a pressure in the range 800 to 3500 p.s.i.g., and a liquid hourly space velocity in the range 0.1 to 5.0, in the presence of 200 to 20,000 s.c.f. of hydrogen per barrel of hydrocarbon feedstock supplied to said second reaction zone, and in the presence of a catalyst composite consisting essentially of an ultra-stable crystalline zeolitic molecular sieve cracking component which is a faujasite having a sodium content below 3 weight percent, calculated as $Na_2O$, a unit cell size below about 24.65 angstroms, and a silica/alumina ratio above about 2.15, a component selected from nickel and compounds thereof, and a component selected from tin and compounds thereof.

4. A process as in claim 3, wherein materials boiling above 400° F. are separated from the effluent from said second reaction zone and are recycled to said second reaction zone.

5. A process as in claim 4, wherein said recycled materials boil above 550° F.

6. A process as in claim 3, wherein materials boiling below 400° F. are separated from the effluent of said second reaction zone and at least a portion of said separated materials are catalytically reformed.

7. The process of claim 3 wherein the component selected from nickel and compounds thereof is present in an amount of from 0.5 to 15 weight percent, calculated as metal, and the component selected from tin and compounds thereof is present in an amount of from 0.1 to 10 weight percent, calculated as metal.

8. The hydrocarbon conversion catalyst of claim 1, wherein said faujasite is in the ammonia or hydrogen form.

References Cited

UNITED STATES PATENTS

| | | | |
|---|---|---|---|
| 3,399,132 | 8/1968 | Mulaskey | 208—111 |
| 3,132,087 | 5/1964 | Kelley et al. | 208—60 |
| 3,226,762 | 2/1966 | Rabo et al. | 208—111 |
| 3,425,956 | 2/1969 | Baker et al. | 252—455 |

DELBERT E. GANTZ, Primary Examiner

A. RIMENS, Assistant Examiner

U.S. Cl. X.R.

208—89, 111; 252—455